United States Patent
Huang et al.

(10) Patent No.: US 11,091,374 B1
(45) Date of Patent: Aug. 17, 2021

(54) METHOD TO PRODUCE HIGH PURITY GERMANE FROM GERMANIUM DIOXIDE OR IMPURE GERMANIUM COMPOUNDS

(71) Applicant: Ge Solartech, LLC, Troy, MI (US)

(72) Inventors: Baoquan Huang, Troy, MI (US); Henry Lee, West Bloomfield, MI (US)

(73) Assignee: Ge Solartech, LLC, Troy, MI (US)

( * ) Notice: Subject to any disclaimer, the term of this patent is extended or adjusted under 35 U.S.C. 154(b) by 82 days.

(21) Appl. No.: 16/586,939

(22) Filed: Sep. 28, 2019

(51) Int. Cl.
*C01G 17/00* (2006.01)

(52) U.S. Cl.
CPC .................. *C01G 17/003* (2013.01)

(58) Field of Classification Search
CPC ..................................... C01G 17/00
See application file for complete search history.

(56) References Cited

U.S. PATENT DOCUMENTS

| 4,668,502 A | 5/1987 | Russotti | |
|---|---|---|---|
| 2010/0183500 A1* | 7/2010 | Lee | C01B 6/06 423/645 |
| 2015/0175418 A1* | 6/2015 | Lee | B01J 19/18 423/645 |

FOREIGN PATENT DOCUMENTS

| WO | WO2005005673 A2 | 1/2005 | |
|---|---|---|---|
| WO | WO-2008093286 A2 * | 8/2008 | ............ C01B 3/065 |
| WO | WO2010057073 A2 | 5/2010 | |

* cited by examiner

*Primary Examiner* — Anthony J Zimmer
*Assistant Examiner* — Syed T Iqbal
(74) *Attorney, Agent, or Firm* — Kevin L. Bray

(57) ABSTRACT

A method for the production of germane includes reacting an oxide of germanium and/or a non-oxide of germanium compound with a borohydride in a base solution. The method permits production of germane from impure germanium-containing starting materials. Catalysts for the reaction include transition metal elements, as well as oxides, hydroxides, halides, and other complexes or compounds of transition metals. Application of heat increases the efficiency of the catalyst. The methods also include production of germane through oxidation of a pure or impure oxide or non-oxide of germanium. The oxidation is effected by contacting the germanium-containing solid phase starting material with an oxidizing solution. The oxidizing solution may be a basic solution comprising a hydroxide or an acidic solution. The oxidation product of the germanium-containing solid phase starting material is converted to germane through an electrochemical or chemical reduction process.

20 Claims, 2 Drawing Sheets

METHOD TO PRODUCE HIGH PURITY GERMANE FROM GERMANIUM DIOXIDE OR IMPURE GERMANIUM COMPOUNDS

FIELD OF THE INVENTION

The present disclosure relates to a method to produce high purity germane ($GeH_4$) with high efficiency and low manufacturing cost. The method produces high purity germane from an aqueous germanium-containing solution in the presence of base. Further, the disclosure provides a catalyst for improving the kinetics of the production of germane. The application of heat is also shown to promote the rate of production of germane from a basic aqueous germanium-containing solution. The method enables production of germane from a wide range of germanium starting materials, including germanium byproducts, impure germanium compounds, and waste products generated in the plasma deposition of thin films containing germanium.

BACKGROUND OF THE INVENTION

High purity germane ($GeH_4$) with semiconductor grade is widely used in the chemical vapor deposition (CVD) of materials containing germanium and devices for the fabrication of the semiconductor chips in group IV microelectronic and optoeletronic technologies. For example, heteroepitaxial $Ge_{1-x}Si_x$ layers on Si(100) are used in many applications in key technologies such as MEMS, quantum cascade lasers and Si-based photonics including high speed modulators and photodetectors. Other uses of germane include thin film amorphous silicon solar cells.

Benefiting from rapid growth in semiconductor industry and thin film technology overall, the market for germane experiences above average growth as well. Global demand for germane was valued at over US$500 million in 2018 and will witness robust growth in the next few years.

Known methods for the production of germane include reacting a mixture of germanium dioxide and sodium borohydride with sulfuric acid in solution (such as the process described in U.S. Pat. No. 4,668,502 by Russotti, entitled "Method of Synthesis of Gaseous Germane"). This production process is very expensive because it suffers from low conversion efficiency and a requirement of high purity germanium dioxide as a starting material. High purity germanium dioxide is produced by a very complicated process, which consumes a significant amount of chemicals and energy. Further, the germane product from this process contains a large amount of higher germanes, such as digermane ($Ge_2H_6$) and trigermane ($Ge_3H_8$), etc. The separation of germane from higher germanes is very difficult and requires significant cost and effort because of their similarity in chemical properties. Moreover, germane synthesized from this process may contain a variety of low-level chemical impurities. Elements capable of forming hydrides (such as B, P, As, Sb, S) are volatilized with the germane, and contaminate the Ge formed during decomposition. These impurities can cause defects that reduce yields. Chemical impurities may originate in the starting materials, such as in $NaBH_4$, KOH and $H_2SO_4$. The process for removing those chemical impurities from germane is highly expensive.

Another process for manufacturing germane is electrolysis of a germanium dioxide containing aqueous-alkaline solution (such as that described in 'Method for Preparing High-Purity Germanium Hydride" by Vorotyntsev and published as International Publication Number WO2010057073). Although this process may provide relatively high purity germane, it suffers from very expensive equipment and is difficult to scale up. The electrolysis process also uses high purity germanium dioxide as a starting material. The prevailing commercial processes for germane suffer from high manufacturing cost and low purity product. A high efficiency and low manufacturing cost method for the production of high purity germane is required for the semiconductor and solar cell industry.

SUMMARY OF THE INVENTION

This disclosure provides a process for producing germane gas in high yield from the reaction of a germanium-containing aqueous solution with a borohydride in the presence of a base. The process includes a mixture of a germanium-containing aqueous alkaline solution with an alkaline stabilized borohydride solution. A catalyst promotes the hydrolysis of borohydride to produce germane gas from a germanium-containing starting material in the base environment. Application of heat enhances the efficiency of the catalyst.

The method described herein provides a high efficiency and low manufacturing cost process for producing high purity germane gas from a germanium-containing aqueous solution. In one embodiment, the germanium-containing aqueous solution includes a germanium-containing starting material. Germanium-containing starting materials include germanium oxides, germanium alloys, germanium metal or germanium-containing solids (including solids produced as waste byproducts in reactions of germanium or germanium compounds). The germanium-containing starting material is combined with a base to form an alkaline aqueous solution that reacts with a borohydride in the presence of a catalyst to form germane. In another embodiment, the solution is kept basic (pH>7.0) throughout the reaction to obtain high purity germane gas.

In one embodiment, a catalyst is introduced into the system in order to promote the kinetics of the reactions. The catalyst includes a transition metal, a transition metal alloy, a transition metal oxide, and/or a transition metal compound, etc. In another embodiment, the catalyst is a transition metal compound or transition metal complex such as a transition metal oxide, a transition metal hydroxide, a transition metal halide, a transition metal sulfate, or a transition metal salt. The representative transition metal of the catalyst includes cobalt, iron, ruthenium, rhodium, nickel, manganese, molybdenum, chromium, vanadium, titanium, zirconium, palladium, etc.

In one embodiment, application of heat improves the efficiency of the catalyst so that the rate of production of germane in the reaction is highly enhanced. The reaction temperatures range from 0° C.-350° C., preferably 50° C.-250° C., more preferably 90° C.-180° C., most preferably 110° C.-130° C.

In other embodiments, this disclosure also provides a process for producing germane gas from germanium-containing solids. The process includes oxidizing germanium in the solid and converting the oxidized germanium reaction product to germane gas through an electrochemical process or a reaction with a reducing agent in a reaction with a borohydride in the presence of a base and the catalyst.

The instant process provides an efficient route to germane gas from impure solid starting materials in which the impure starting material includes germanium in combination with one or more other elements in a solid. In one embodiment, the germanium-containing solid includes germanium and silicon. In another embodiment, the germanium-containing solid includes germanium and a metal. In a further embodiment, the germanium-containing solid includes germanium and one or more of boron, phosphorous, arsenic, carbon, or hydrogen. The germanium-containing starting material optionally includes oxygen.

In one embodiment, oxidation of the germanium-containing solid occurs by immersing it in an oxidizing solution. The oxidizing solution may be a metal hydroxide solution. Representative metal hydroxide solutions include alkali metal hydroxides, alkaline earth hydroxides, and transition metal hydroxides. In another embodiment, the oxidizing solution may be an acid or an acidic solution. Immersion of the germanium-containing solid in the oxidizing solution may cause dissolution of the solid to form a solution and/or formation of a slurry or suspension of the solid.

The oxidized form of the germanium-containing solid preferably includes germanium dioxide ($GeO_2$) and may be converted to germane gas through an electrochemical reduction process or through a chemical reaction with a reducing agent.

In an embodiment of the instant process the germanium-containing solid is a byproduct formed in a gas phase or plasma reaction of germane or other germanium-containing gas. In one embodiment, a gas phase germanium precursor is reacted, alone or in combination with other precursors, to form a thin film material and the germanium in the unutilized fraction of the germanium precursor forms a solid from which germane gas can be recovered through the methods described herein.

DETAILED DESCRIPTION OF THE ILLUSTRATED EMBODIMENTS

Figure 1:
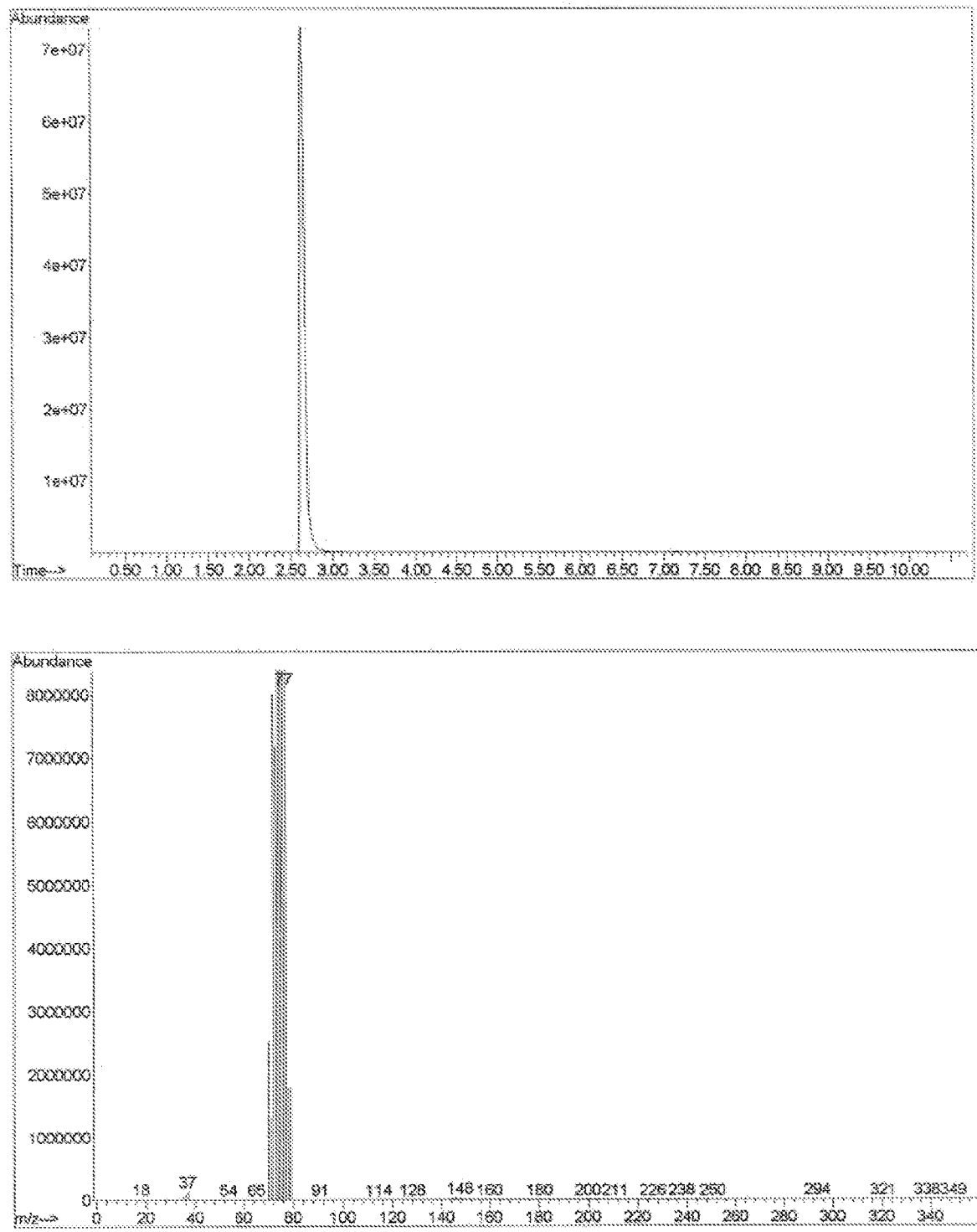
FIG. 1 is a gas chromatograph (GC) at 70° C. (Top) and mass spectrometry (MS) (Bottom) of germane gas synthesized from chemical reduction reaction of germanium dioxide in base solution.

Although this disclosure describes certain preferred embodiments in detail, other embodiments that are apparent to those of ordinary skill in the art, including embodiments that do not provide all the benefits and features set forth herein, are also within the scope of this disclosure. Accordingly, the scope of the disclosure is defined only by reference to the appended claims.

In this specification and in the claims which follow, reference will be made to a number of terms which shall be defined to have the following meanings:

"Germane" means $GeH_4$.

The description herein provides a process for producing high purity germane with high efficiency and low manufacturing cost. The prevailing commercial process for producing germane, such as the process disclosed in U.S. Pat. No. 4,668,502, is the reaction of a solution of germanium dioxide with an alkali metal borohydride in the presence of an acid. High purity germanium dioxide is required as a starting material. High purity germanium dioxide is an undesirable starting material because it is obtained from a costly and complicated process, which is often labor and energy intensity. Further, the product of the prevailing process includes many impurities and higher order germanes (e.g. digermane and trigermane). Purification of impure germane is an expensive process. As a result, the cost of germane is high. Another commercial process for producing germane is an electrochemical method. Although this process may provide high purity germane, it suffers from the need for expensive production equipment and is difficult to scale up. The electrochemical process also uses high purity germanium dioxide as a starting material. The instant description provides a process that enables production of germane at low cost and high purity.

The instant description provides methods to produce high purity germane gas in high yield. The methods include reactions of germanium-containing solids with a borohydride in a basic solution. In one embodiment, the germanium-containing solids are impure forms of an oxide of germanium, such as an impure form of germanium dioxide. Examples include oxides of germanium that include non-metals (e.g. B, P, S, N) and/or semi-metals (e.g. As, Sb) as impurities. In the reactions disclosed herein, the germanium-containing solid is dissolved in solution. In solution, impurities can form volatile oxides that are released as byproducts along with germane as germanium from the germanium-containing solid reacts with the borohydride ion ($BH_4^-$). In addition, hydrolysis of the borohydride ion leads to production of hydrogen, which can react with many impurities in germanium-containing solids to form volatile hydrides that are released with the germane product. Examples of oxides and hydrides that form from non-metal and semi-metal impurities include $B_2O_3$, $P_2O_5$, $P_2O_3$, $As_2O_5$, $Sb_2O_5$, $SO_2$, $SO_3$, $NO$, $NO_2$, $PH_3$, $AsH_3$, $SbH_3$, $B_2H_6$, and $H_2S$. The presence of volatile oxides or hydrides as byproducts leads to contamination of germane. As a result, expensive separation processes are required to obtain germane in a pure state when impurities are present in the germanium-containing starting material.

In prior art reactions of germanium dioxide with borohydrides, acids are used to catalyze hydrolysis of the borohydride ion. The acidic conditions, however, promote release of volatile oxide and hydride byproducts of impurities as well as the formation of higher order germanes. As used herein, "higher germane" or "higher order germane" refers to a hydrogenated germanium compound that includes two or more germanium atoms (e.g. digermane, trigermane). Germane, for example, reacts to form digermane and trigermane through hydrogen abstraction in acidic solution according to the reactions:

$$GeH_4 + H^+ \rightarrow .GeH_3 + H_2 \tag{1}$$

$$H_3Ge. + .GeH_3 \rightarrow Ge_2H_6 \tag{2}$$

$$Ge_2H_6 + H^+ \rightarrow .Ge_2H_5 + H_2 \tag{3}$$

$$H_3Ge. + .Ge_2H_5 \rightarrow Ge_3H_8 \tag{4}$$

The reactions described herein recognize that many volatile oxides and hydrides of non-metal and semi-metal elements show acidic character in aqueous solution and can be stabilized, or rendered less volatile, in basic solution. Mechanisms of stabilization include salt formation. Germane, in contrast, has low acidity and is not particularly reacted with basic solution. As a result, the volatility of germane remains high in basic solution and reaction of impure forms of germanium dioxide with a borohydride in basic solution produces germane in a highly pure state. The basic conditions lead to retention of impurities in the form of oxides and/or hydrides in the solution phase while germane remains volatile and is released from the basic solution as a gas phase product. The tendency of many non-metal and semi-metal impurities to remain in basic solutions provides a convenient way to separate the germanium in germanium-containing solids from impurities. The purity requirements for germanium-containing solids are accordingly relaxed and a wider range (e.g. lower grade, less pure) of germanium-containing solids can be used as starting materials for the production of germane through reactions of borohydrides under basic conditions.

Representative bases include alkali metal hydroxides, alkaline earth hydroxides, quaternary ammonium hydroxides (e.g. ammonium hydroxide, alkyl-substituted ammonium hydroxide), rare earth hydroxides, and transition metal hydroxides. The bases can be used individually or in combination.

The pH of the basic solution is greater than 7.0, or greater than 8.0, or greater than 9.0, or greater than 10.0, or greater than 11.0, or in the range from 7.0-13.0, or in the range from 8.0-12.5, or in the range from 9.0-12.0.

In one embodiment, the methods disclosed herein produce germane with high purity in reactions with borohydrides in base solution. It is known, however, that basic conditions inhibit hydrolysis of borohydride ions. Although avoiding acidic conditions promotes preferential volatilization of germane relative to volatile oxides and hydrides of impurities, the absence of an acid removes a catalyst for borohydride hydrolysis and leads to a reduction in the rate of reaction. To compensate for lack of an acid, the methods of the present disclosure include a catalyst effective to promote borohydride hydrolysis under basic conditions. Suitable catalysts include transition metal catalysts such as transition metals, transition metal alloys, transition metal oxides, transition metal hydroxides, transition metal halides, transition metal sulfates, transition metal complexes, and transition metal compounds. The transition metal of the transition metal catalyst include cobalt, iron, ruthenium, rhodium, nickel, manganese, molybdenum, chromium, vanadium, titanium, zirconium, palladium, and copper, zinc, silver, and gold. Preferably, the transition metal of the transition metal catalyst is cobalt, iron, ruthenium, nickel and manganese. Most preferably, the transition metal of the transition metal catalyst is cobalt or ruthenium. Cobalt metal and ruthenium metal are particularly preferred catalysts. The reactions described herein provide methods to enhance the kinetics of germane production in a controlled way through utilization of the catalyst.

In addition, elimination of the acid inhibits formation of higher germanes (e.g. digermane, trigermane etc.) by suppressing the hydrogen abstraction reactions described above. As the result, the base solution provides an environment to selectively produce pure germane without higher germanes. The synthesis reaction of germane is thermodynamically controlled in the base environment. To illustrate, the bond energy of Ge—Ge is much lower than the bond energy of Ge—H. Thus, the formation of germane is energetically favored. Conversely, the reactions to form higher order germanes, such as digermane and trigermane, are energetically disfavored. This provides an advantage to production of pure germane gas. The methods described herein selectively produce germane relative to higher germanes. The molar ratio of germane to higher order germanes in the product of the reactions described herein is greater than 80:1, or greater than 90:1, or greater than 95:1, or greater than 100:1, or greater than 500:1, or greater than 1000:1.

In another embodiment, application of heat accelerates the rate of production of germane in the reactions disclosed herein. High temperatures enhance the efficiency of the catalyst and facilitate the formation of germane at high rates. The method comprises heating the basic solution. The reaction temperatures range from 0° C. to 350° C., or from 50° C.-250° C., or from 50° C.-180° C. or from 90° C.-180° C., or from 100° C.-130° C.

The methods disclosed herein provide processes for producing germane from a wide variety of solid phase germanium-containing starting materials. The prevailing commercial process for producing germane uses high purity germanium dioxide ($GeO_2$) as a starting material. High purity germanium dioxide is prepared commercially from a fly ash or zinc ore processing method. Since these processes are expensive to operate, the germanium dioxide source material for the commercial production of germane is costly and the cost of germane gas is accordingly high. By expanding the range of potential germanium-containing starting materials (including, for example, germanium-containing starting materials with impurities) for germane production, the reactions described herein provide an opportunity to greatly reduce the cost of germane.

The methods disclosed herein permit the formation of germane from virtually any germanium-containing solid, whether pure or impure. The germanium-containing solid may be an oxide or a non-oxide. The germanium-containing solid may include germanium in combination with one or more of silicon, boron, phosphorous, arsenic, transition metal, alkali metal, alkaline earth metal, post-transition metal, or halogen. The germanium-containing solid may be a crystalline, polycrystalline, or amorphous phase material and may be a single phase or multiple phase material.

In one embodiment, the germanium-containing starting material includes a germanium oxide phase (e.g. $GeO_2$) with one or more impurities in the form of a solid solution. In another embodiment, the germanium-containing starting material includes a heterogeneous mixture of a germanium oxide phase (with or without an impurity) and another solid material (which may or may not contain germanium and which may or may not be an oxide).

In one embodiment, less than 90 wt % of the germanium in the germanium-containing solid starting material is in the form of germanium dioxide. In a second embodiment, less than 80 wt % of the germanium in the germanium-containing solid starting material is in the form of germanium dioxide. In a third embodiment, less than 70 wt % of the germanium in the germanium-containing solid starting material is in the form of germanium dioxide. In a fourth embodiment, less than 50 wt % of the germanium in the germanium-containing solid starting material is in the form of germanium dioxide. In a fifth embodiment, the germanium-containing solid starting material includes germanium in the form of germanium dioxide and a non-oxide of germanium.

In one embodiment, the germanium-containing solid is formed as a byproduct of a thin film process that forms a germanium-containing material. The thin film process may be a chemical vapor deposition process (e.g. CVD, PECVD, MOCVD) or a plasma deposition process (e.g. PECVD, sputtering, reactive sputtering) that uses a germanium precursor. In the thin film process, a gas phase germanium precursor is delivered to the deposition process and reacted or decomposed to deposit a germanium-containing thin film material on a substrate. In most thin film processes, the utilization of the germanium precursor is low and only a relatively small fraction of the germanium available from the precursor gets incorporated in the deposited thin film material. The balance of the germanium is vented as a gas phase waste product or becomes incorporated in a solid phase byproduct. Such solid phase byproducts are within the scope of starting materials for producing germane gas in the context of the instant disclosure.

In one embodiment, the germanium-containing solid is formed as a byproduct of the reaction of silane ($SiH_4$) and germane ($GeH_4$). In this reaction, silane and germane are gas phase precursors that react to form a silicon-germanium alloy ($Si_xGe_{1-x}$) on a substrate. The utilization of germane is low and less than half of the germanium supplied with the germane precursor is incorporated in the silicon-germanium alloy. A substantial fraction of the germanium ends up in a solid phase byproduct that also includes silicon. The byproduct may also contain low levels of oxygen. If the silicon-germanium alloy formed in the process is formed as an intentionally doped n-type or p-type material, the byproduct may also include doping elements such as boron, phosphorous, or arsenic.

In other germanium thin film deposition process, the germanium precursor is an organometallic compound such as an alkyl germanium compound (e.g. $Ge(CH_3)_4$, $Ge(C_2H_5)_4$) or a germanium amine compound (e.g. $Ge(NH_3)_4$). In these processes, the byproduct germanium-containing solid may also include nitrogen, carbon, and/or hydrogen.

In embodiments where the germanium-containing solid is formed as a byproduct of a gas phase reaction or decomposition involving a germanium precursor, embodiments of the method disclosed herein further include recovery of the germanium precursor from the effluent of the process. As indicated hereinabove, only a portion of the germanium precursor used in thin film deposition processes is utilized and significant amounts of unutilized germanium exit the process in an effluent stream. The effluent stream may include unreacted germanium precursor, gas-phase byproducts formed in the process, diluent gases, and/or air. The gas-phase byproducts include germanium-containing gases other than germane and/or gases that do not contain germanium. The effluent gas may be captured and fractionated to recover unreacted gas phase germanium precursors or germanium-containing byproduct gases. Recovery of germanium from both the effluent and solid phase byproducts improves the overall efficiency and economics of the process.

In some embodiments, the germanium-containing starting material is first oxidized to form an oxidation product that is subsequently converted to germane gas. The oxidation product is used as a starting material in embodiments of the reaction described herein. For example, the oxidation product can be reacted with borohydride in a basic solution in the presence of a catalyst as described herein. In one embodiment, the oxidation process includes contacting the germanium-containing starting material with an oxidizing solution. The oxidizing solution may be a basic solution, where the base is a hydroxide compound. Hydroxide compounds include alkali metal hydroxide (e.g. NaOH, KOH), alkaline earth hydroxide (e.g. $Ca(OH)_2$, $Sr(OH)_2$, $Mg(OH)_2$), or transition metal hydroxide (e.g. $Ni(OH)_2$, $Cu(OH)_2$). In another embodiment, the oxidizing solution includes an acid. The acid may be a strong acid such as hydrochloric acid, nitric acid or sulphuric acid. Hydrochloric acid (HCl) can be used to convert germanium in the germanium-containing solid to germanium chloride ($GeCl_4$), which can then be hydrolyzed to an oxide form of germanium (e.g. $GeO_2$) and reacted to form germane as described herein. The oxidation product includes germanium in an oxidized state and the oxidation step converts non-oxidic germanium-containing starting materials (or non-oxidic germanium-containing impurity phases in germanium oxide solids) into an oxide form of germanium.

In these embodiments, germane is produced from the oxidation product of the germanium-containing starting material. The production of germane from the oxidation product of the germanium-containing starting material may occur through an electrochemical reduction process (such as that described in "Method for Preparing High-Purity Germanium Hydride" by Vorotyntsev and published as International Publication Number WO 2005/005673, the disclose of which is incorporated by reference herein) or through a chemical reaction of the oxidation product of the germanium-containing starting material with a reducing agent (such as the process described in U.S. Pat. No. 4,668,502 by Russotti, entitled "Method of Synthesis of Gaseous Germane", the disclosure of which is incorporated by reference herein).

In a typical electrochemical process, germane is prepared from a solution or slurry of the oxidation product of the germanium-containing starting material. The electrolysis may be performed in an aqueous alkaline solution or slurry of the oxidation product of the germanium-containing starting material. The electrochemical process may be performed in an electrochemical diaphragm cell using, for example, a nickel cathode.

In a typical chemical reduction process, the oxidation product of the germanium-containing solid is dissolved or suspended in an aqueous hydroxide base and reacted with a metal borohydride or metal aluminum hydride (e.g. $NaBH_4$, $LiBH_4$, $LiAlH_4$). The product of this reaction is acidified with a strong acid to form a gaseous product, which is then purified to form germane gas.

The invention will be illustrated in more detail with reference to the following examples.

Example 1

[00042] 350 g KOH (>85%, Sigma-Aldrich) was dissolved in 10 liters of distilled water to obtain an alkaline aqueous solution. The alkaline aqueous solution was heated at 60° C. 300 g $GeO_2$ (99.9%, HEFA Rare earth Canada Co. LTD) was dissolved in the heated alkaline aqueous solution with vigorous stirring to obtain solution A. 600 g $NaBH_4$ (>98%, Alfa Aesar) was dissolved in 5 liter distilled water containing 2 wt % KOH to obtain solution B. 10 g $CoSO_4.H_2O$ (a catalyst) was dissolved in 100 ml distilled water to obtain solution C. Solutions A, B, C were pumped into a sealed stainless steel pressure vessel. The reaction mixture was heated, and the pressure of the vessel started to increase due to evolution of a gas-phase product as the temperature was increased above about 100° C. The gas-phase product was collected and analyzed by gas chromatography-mass spectrometry. The top portion of FIG. 1 shows the gas chromatography spectrum (relative abundance as a function of time in minutes) of the gas-phase product and the lower portion of FIG. 1 shows the mass spectrum (relative abundance as a function of the mass: charge ratio (m/z)) of the gas-phase product. The gas-phase product contained only germane and hydrogen gas.

Example 2

300 g $Si_{1-x}Ge_x$ alloy (Ge: 29.0 wt %) was gradually added to KOH solution (600 g KOH, 400 ml $H_2O$) at 60° C. to obtain a supersaturated solution. Four liters of water was then added to obtain the solution A. 300 g KOH was dissolved in 2.5 liters of distilled water containing 2 wt %

Figure 2:
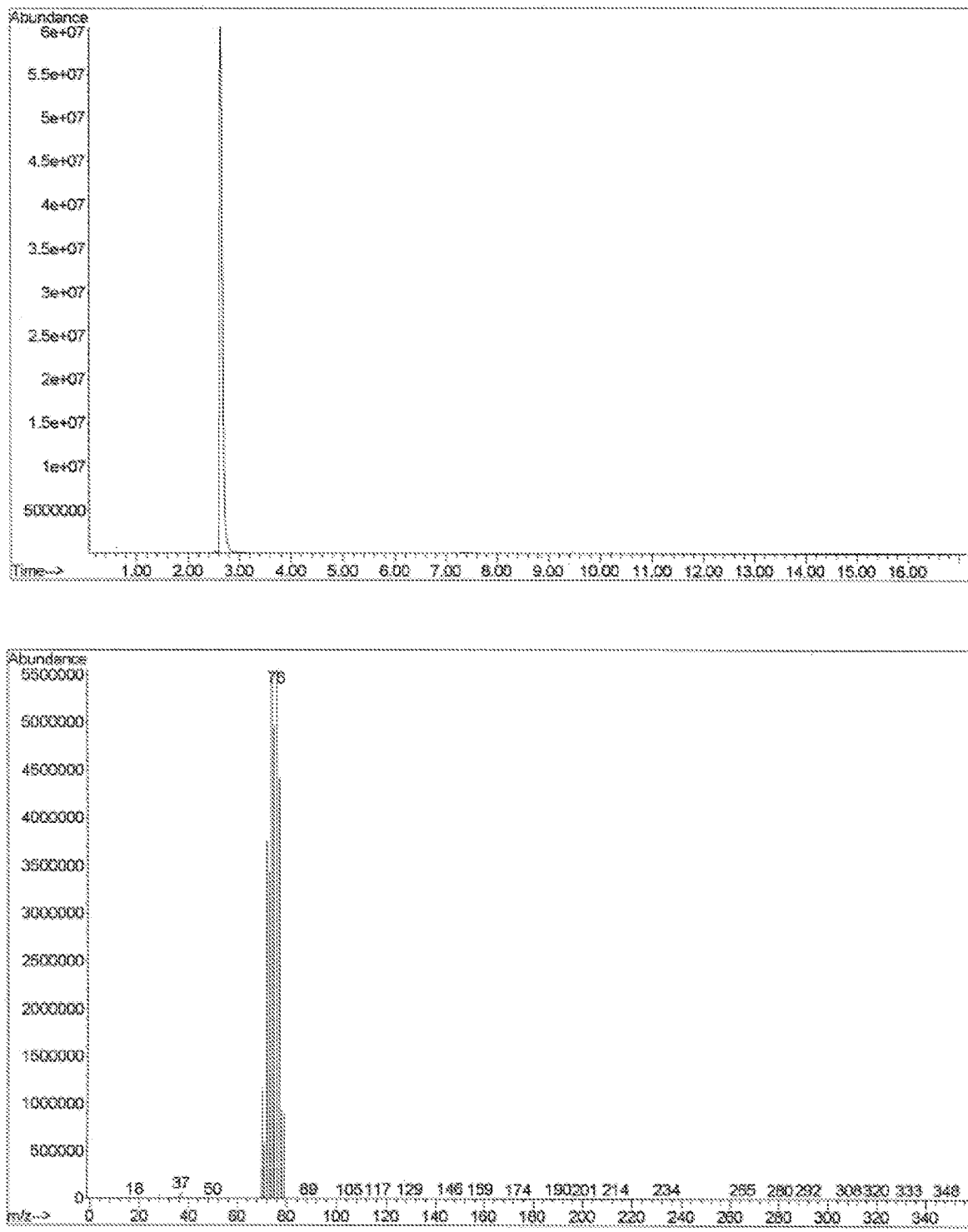
FIG. 2 is a gas chromatograph (GC) at 70° C. (Top) and mass spectrometry (MS) (Bottom) of germane gas synthesized from chemical reduction reaction of oxidized germanium-silicon alloys in base solution.

KOH to obtain solution B. 5 g $CoSO_4 \cdot H_2O$ (a catalyst) was dissolved in 50 ml distilled water to obtain solution C. Solutions A, B, C were pumped into a sealed stainless steel pressure vessel. The reaction mixture was heated and the pressure of vessel started to increase due to evolution of a gas-phase product as the temperature was increased above about 100° C. The gas-phase product was collected and analyzed by gas chromatography. The top portion of FIG. 2 shows the gas chromatography spectrum (relative abundance as a function of time in minutes) of the gas-phase product and the lower portion of FIG. 2 shows the mass spectrum (relative abundance as a function of the mass:charge ratio (m/z)) of the gas-phase product. The gas-phase product contained only germane and hydrogen gas.

Aspect 1 of the disclosure is:
A method for producing germane comprising:
reacting a germanium-containing starting material in a solution to form the germane, the solution comprising a base and a borohydride.

Aspect 2 of the disclosure is:
The method of Aspect 1, wherein the germanium-containing starting material comprises an oxide of germanium.

Aspect 3 of the disclosure is:
The method of Aspect 2, wherein the germanium-containing starting material further comprises an element selected from the group consisting of boron, phosphorous, silicon, sulfur, arsenic, and antimony.

Aspect 4 of the disclosure is:
The method of Aspect 3, wherein the element forms a solid solution with the oxide of germanium.

Aspect 5 of the disclosure is:
The method of Aspect 2 or 3, wherein the germanium-containing starting material further comprises a non-oxide of germanium.

Aspect 6 of the disclosure is:
The method of Aspect 5, wherein the non-oxide of germanium is a halide of germanium.

Aspect 7 of the disclosure is:
The method of Aspect 5 or 6, wherein the non-oxide of germanium comprises silicon.

Aspect 8 of the disclosure is:
The method of any of Aspects 5-7, wherein the oxide of germanium and the non-oxide of germanium collectively contain an amount of germanium and less than 70 wt % of the amount of the germanium is in the oxide of germanium.

Aspect 9 of the disclosure is:
The method of any of Aspects 1-8, wherein the germanium-containing starting material comprises a non-oxide of germanium.

Aspect 10 of the disclosure is:
The method of any of Aspects 1-9, wherein the germanium-containing starting material comprises an alkali metal, an alkaline earth metal, a transition metal, or a post-transition metal.

Aspect 11 of the disclosure is:
The method of any of Aspects 1-10, wherein the base is a hydroxide.

Aspect 12 of the disclosure is:
The method of Aspect 11, wherein the hydroxide is an alkali metal hydroxide, an alkaline earth hydroxide, a rare earth hydroxide, a quaternary ammonium hydroxide, or a transition metal hydroxide.

Aspect 13 of the disclosure is:
The method of any of Aspects 1-12, wherein the solution has a pH greater than 7.0.

Aspect 14 of the disclosure is:
The method of any of Aspects 1-12, wherein the solution has a pH greater than 9.0.

Aspect 15 of the disclosure is:
The method of any of Aspects 1-12, wherein the solution has a pH greater than 11.0.

Aspect 16 of the disclosure is:
The method of any of Aspects 1-15, wherein the solution further comprises a catalyst, the catalyst comprising a transition metal.

Aspect 17 of the disclosure is:
The method of Aspect 16, wherein the transition metal is selected from the group consisting of cobalt, ruthenium, iron, nickel and manganese.

Aspect 18 of the disclosure is:
The method of Aspect 16 or 17, wherein the catalyst comprises a transition metal compound or a transition metal complex, the transition metal compound or the transition metal complex comprising the transition metal.

Aspect 19 of the disclosure is:
The method of Aspect 18, wherein the transition metal compound or the transition metal complex comprises oxygen, hydroxide, sulfate, or halide.

Aspect 20 of the disclosure is:
The method of any of Aspects 1-19, wherein the borohydride comprises an alkali metal or an alkaline earth metal.

Aspect 21 of the disclosure is:
The method of any of Aspects 1-20, further comprising heating the solution.

Aspect 22 of the disclosure is:
The method of Aspect 21, wherein the solution is heated to a temperature in the range from 50° C.-180° C.

Aspect 23 of the disclosure is:
The method of Aspect 21, wherein the solution is heated to a temperature in the range from 100° C.-130° C.

Aspect 24 of the disclosure is:
The method of any of Aspects 1-23, wherein the method produces a gas phase product, the gas phase product comprising the germane and wherein the molar ratio of germane to higher order germanes in the gas-phase product is greater than 95:1.

Aspect 25 of the disclosure is:
The method of any of Aspects 1-24, wherein the germanium-containing starting material comprises an amount of germanium and the germane comprises greater than 70 wt % of the amount of germanium.

Aspect 26 of the disclosure is:
The method of any of Aspects 1-24, wherein the germanium-containing starting material comprises an amount of germanium and the germane comprises greater than 90 wt % of the amount of germanium.

Aspect 27 of the disclosure is:
The method of any of Aspects 1-26, further comprising forming the germanium-containing starting material.

Aspect 28 of the disclosure is:
The method of Aspect 27, wherein the forming the germanium-containing starting material comprises oxidizing a germanium-containing solid to form an oxidation product.

Aspect 29 of the disclosure is:
The method of Aspect 27 or 28, wherein the germanium-containing solid comprises a non-oxide of germanium.

Aspect 30 of the disclosure is:
The method of Aspect 28 or 29, wherein the solution comprises the oxidation product.

Aspect 31 of the disclosure is:
The method of Aspect 30, further comprising electrolysis of the solution.

Aspect 32 of the disclosure is:
The method of any of Aspects 28-31, further comprising reacting the oxidation product with a reducing agent.

Aspect 33 of the disclosure is:
The method of any of Aspects 27-32, wherein the germanium-containing solid comprises Si.

Those skilled in the art will appreciate that the methods and designs described have additional applications and that the relevant applications are not limited to the illustrative example described herein. The present disclosure may be embodied in other specific forms without departing from the essential characteristics or principles as described herein. The embodiments described above are to be considered in all respects as illustrative only and not restrictive in any manner upon the scope and practice of the methods disclosed herein. It is the following claims, including all equivalents, which define the true scope of the disclosure.

What is claimed is:

1. A method for producing germane comprising:
reacting a germanium-containing starting material in a solution to form the germane, the germanium-containing starting material comprising an oxide of germanium and a non-oxide of germanium, the solution having a pH greater than 7.0 and comprising a base and a borohydride.

2. The method of claim 1, wherein the germanium-containing starting material further comprises an element selected from the group consisting of boron, phosphorous, silicon, sulfur, arsenic, and antimony.

3. The method of claim 1, wherein the non-oxide of germanium comprises silicon.

4. The method of claim 1, wherein the oxide of germanium and the non-oxide of germanium collectively contain an amount of germanium and less than 70 wt % of the amount of the germanium is in the oxide of germanium.

5. The method of claim 1, wherein the germanium-containing starting material comprises an alkali metal, an alkaline earth metal, a transition metal, or a post-transition metal.

6. The method of claim 1, wherein the base is an alkali metal hydroxide, an alkaline earth hydroxide, a quaternary ammonium hydroxide, a rare earth hydroxide, or a transition metal hydroxide.

7. The method of claim 1, wherein the solution has a pH greater than 9.0.

8. The method of claim 1, wherein the solution further comprises a catalyst, the catalyst comprising a transition metal.

9. The method of claim 8, wherein the transition metal is selected from the group consisting of cobalt, ruthenium, iron, nickel and manganese.

10. The method of claim 9, wherein the catalyst comprises a transition metal coated on an oxide substrate, a transition metal compound or a transition metal complex, the transition metal compound or the transition metal complex comprising the transition metal.

11. The method of claim 1, further comprising heating the solution.

12. The method of claim 11, wherein the solution is heated to a temperature in the range from 50° C.-180° C.

13. The method of claim 1, wherein the method produces a gas phase product, the gas phase product comprising the germane and wherein the molar ratio of germane to higher order germanes in the gas-phase product is greater than 95:1.

14. The method of claim 1, wherein the germanium-containing starting material comprises an amount of germanium and the germane comprises greater than 90 wt % of the amount of germanium.

15. The method of claim 1, further comprising forming the germanium-containing starting material.

16. The method of claim 15, wherein the forming the germanium-containing starting material comprises oxidizing a germanium-containing solid to form an oxidation product.

17. The method of claim 16, wherein the solution comprises the oxidation product.

18. The method of claim 17, further comprising electrolysis of the solution.

19. The method of claim 17, further comprising reacting the oxidation product with a reducing agent.

20. A method for producing germane comprising:
reacting a germanium-containing starting material in a solution to form the germane, the solution having a pH greater than 7.0 and comprising a base and a borohydride, the germanium-containing starting material comprising a non-oxide of germanium, the germane being formed from the non-oxide of germanium.

* * * * *